United States Patent
Okunishi et al.

(10) Patent No.: US 12,286,116 B2
(45) Date of Patent: Apr. 29, 2025

(54) CONTROL DEVICE

(71) Applicant: HONDA MOTOR CO., LTD., Tokyo (JP)

(72) Inventors: Shinichi Okunishi, Saitama (JP); Tatsuya Konishi, Saitama (JP); Keita Akiho, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 18/113,861

(22) Filed: Feb. 24, 2023

(65) Prior Publication Data

US 2023/0303080 A1 Sep. 28, 2023

(30) Foreign Application Priority Data

Mar. 25, 2022 (JP) .................................. 2022-050620

(51) Int. Cl.
- *B60W 30/18* (2012.01)
- *B60W 40/06* (2012.01)
- *G06V 20/56* (2022.01)

(52) U.S. Cl.
CPC ...... *B60W 30/18163* (2013.01); *B60W 40/06* (2013.01); *G06V 20/588* (2022.01); *B60W 2420/403* (2013.01)

(58) Field of Classification Search
CPC .......... B60W 30/18163; B60W 40/06; B60W 2420/403; G06V 20/588
See application file for complete search history.

(56) References Cited

U.S. PATENT DOCUMENTS

| 9,764,640 B2* | 9/2017 | Matsuno .................. B62D 6/00 |
| 9,934,690 B2* | 4/2018 | Kuroda ................ B62D 15/021 |
| 2014/0067187 A1 | 3/2014 | Ferguson et al. |

(Continued)

FOREIGN PATENT DOCUMENTS

| JP | 2018-060572 A | 4/2018 |
| JP | 2019-053490 A | 4/2019 |

(Continued)

OTHER PUBLICATIONS

Sep. 12, 2023, Translation of Japanese Office Action issued for related JP Application No. 2022-050620.

*Primary Examiner* — Gertrude Arthur Jeanglaude
(74) *Attorney, Agent, or Firm* — Paratus Law Group, PLLC

(57) ABSTRACT

A control device includes a processor configured to acquire output information of a first type of a first sensor and output information of a second type of a second sensor each configured to detect an object in an around of a vehicle, the processor performing first processing of recognizing a first range including a specific object among a plurality of ranges set in a peripheral region of the vehicle based on the output information of the first sensor, and second processing of recognizing a second range including the specific object among the plurality of ranges based on the output information of the second sensor, selecting a third range from the plurality of ranges obtained by excluding the first range based on the first range, and determining reliability of a recognition result of the first range based on a recognition result of the second processing for the third range.

10 Claims, 10 Drawing Sheets

(56) References Cited

U.S. PATENT DOCUMENTS

| | | | |
|---|---|---|---|
| 2017/0327120 A1* | 11/2017 | Oh | B60W 50/082 |
| 2019/0080187 A1 | 3/2019 | Inoue et al. | |
| 2019/0220678 A1 | 7/2019 | Guo et al. | |
| 2019/0286926 A1 | 9/2019 | Miura et al. | |
| 2020/0307643 A1* | 10/2020 | Ikeda | B60K 35/80 |

FOREIGN PATENT DOCUMENTS

| | | |
|---|---|---|
| JP | 2019-125361 A | 7/2019 |
| JP | 2019-156192 A | 9/2019 |

\* cited by examiner

CONTROL DEVICE

CROSS-REFERENCE TO RELATED APPLICATIONS

The present application claims the benefit of priority of Japanese Patent Application No. 2022-050620, filed on Mar. 25, 2022, the content of which is incorporated herein by reference.

TECHNICAL FIELD

The present disclosure relates to a control device.

BACKGROUND ART

In recent years, introduction of automatic driving and driving assistance of vehicles is rapidly progressing. As a technique for the automatic driving and the driving assistance of the vehicles, a technique such as auto lane changing (ALC) has been developed in which the vehicle changes lanes even when a driver does not perform an operation such as steering.

JP-A-2019-156192 discloses a vehicle control device including an external environment recognition unit that recognizes a surrounding state of a host vehicle, an action plan unit that determines an action to be performed by the host vehicle based on a recognition result of the external environment recognition unit, and a vehicle control unit that performs travel control of the host vehicle based on a determination result of the action plan unit.

As in JP-A-2019-156192, it is important to recognize a section in which traveling is restricted on a road (in the present specification, the section is defined as a travel-restricted section), such as a section in which lane regulation is performed due to construction work, an accident, or the like in order to improve safety when the travel control of the vehicle is performed.

SUMMARY

An object of the present disclosure is to improve safety. Further, the present disclosure contributes to development of a sustainable transportation system by further improving safety of traffic.

According to an aspect of the present disclosure, there is provided a control device that performs travel control of a vehicle, the control device including a processor configured to acquire output information of a first type of a first sensor and output information of a second type of a second sensor each configured to detect an object in an around of the vehicle, where the processor is configured to: perform first processing of recognizing a first range including a specific object among a plurality of ranges set in a peripheral region of the vehicle based on the output information of the first sensor, and second processing of recognizing a second range including the specific object among the plurality of ranges based on the output information of the second sensor; select a third range from the plurality of ranges obtained by excluding the first range based on the first range; and determine reliability of a recognition result of the first range based on a recognition result of the second processing for the third range.

According to the present disclosure, safety of the vehicle can be improved.

DESCRIPTION OF EMBODIMENTS

Figure 1:
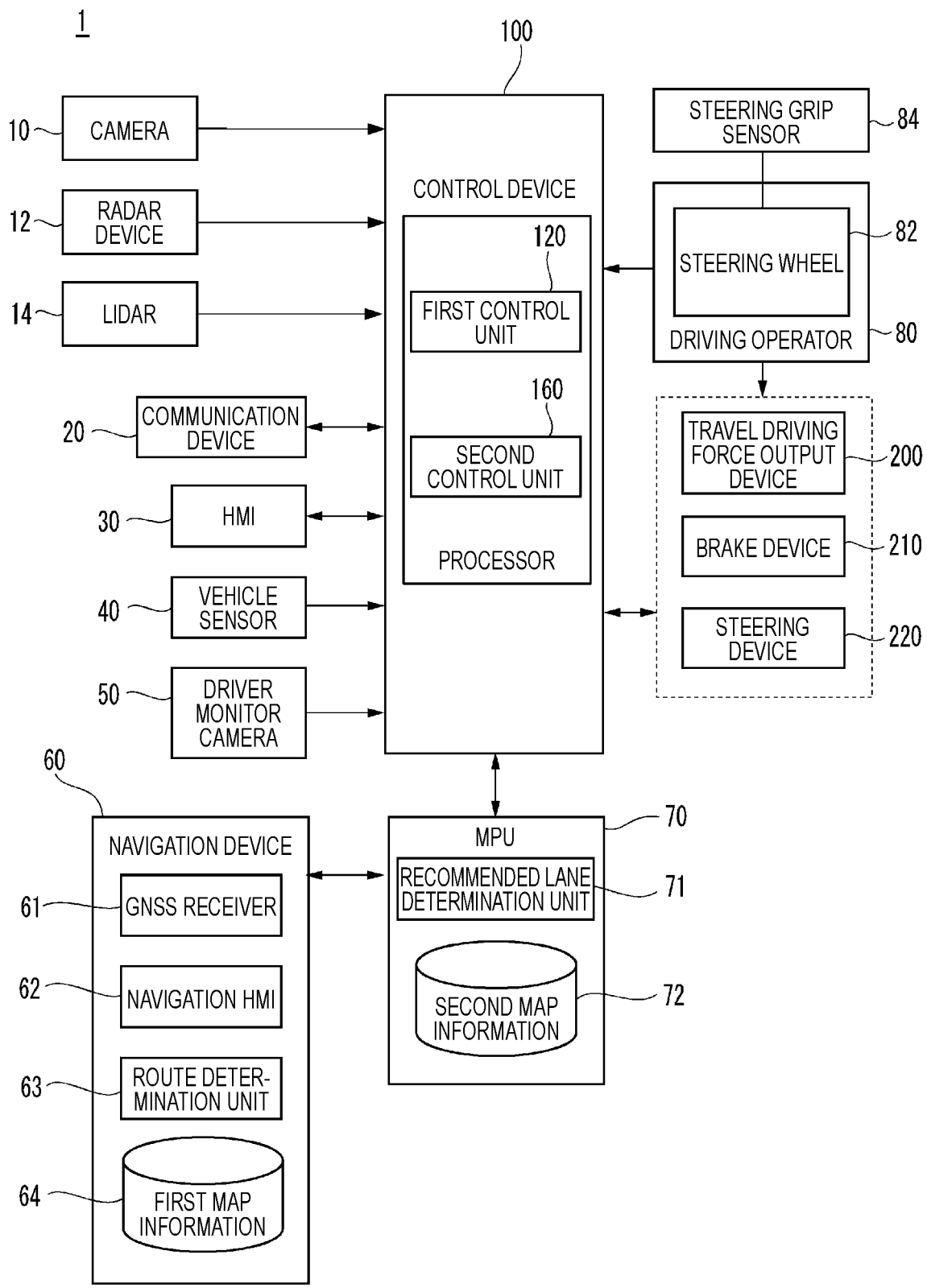
FIG. 1 is a block diagram illustrating an overall configuration of a vehicle system 1 on which a control device 100 is mounted.

Hereinafter, a vehicle system 1 including a control device 100 according to an embodiment of the present disclosure will be described with reference to the drawings. The drawings are viewed in directions of reference numerals. In the present specification, in order to simplify and clarify the description, front, rear, left, and right directions are described in accordance with directions viewed from a driver of a vehicle M illustrated in FIG. 2. In the drawings, a front side of the vehicle M is represented by Fr, a rear side thereof is represented by Rr, a left side thereof is represented by L. and a right side thereof is represented by R.

<Overall Configuration of Vehicle System 1>

Figure 2:
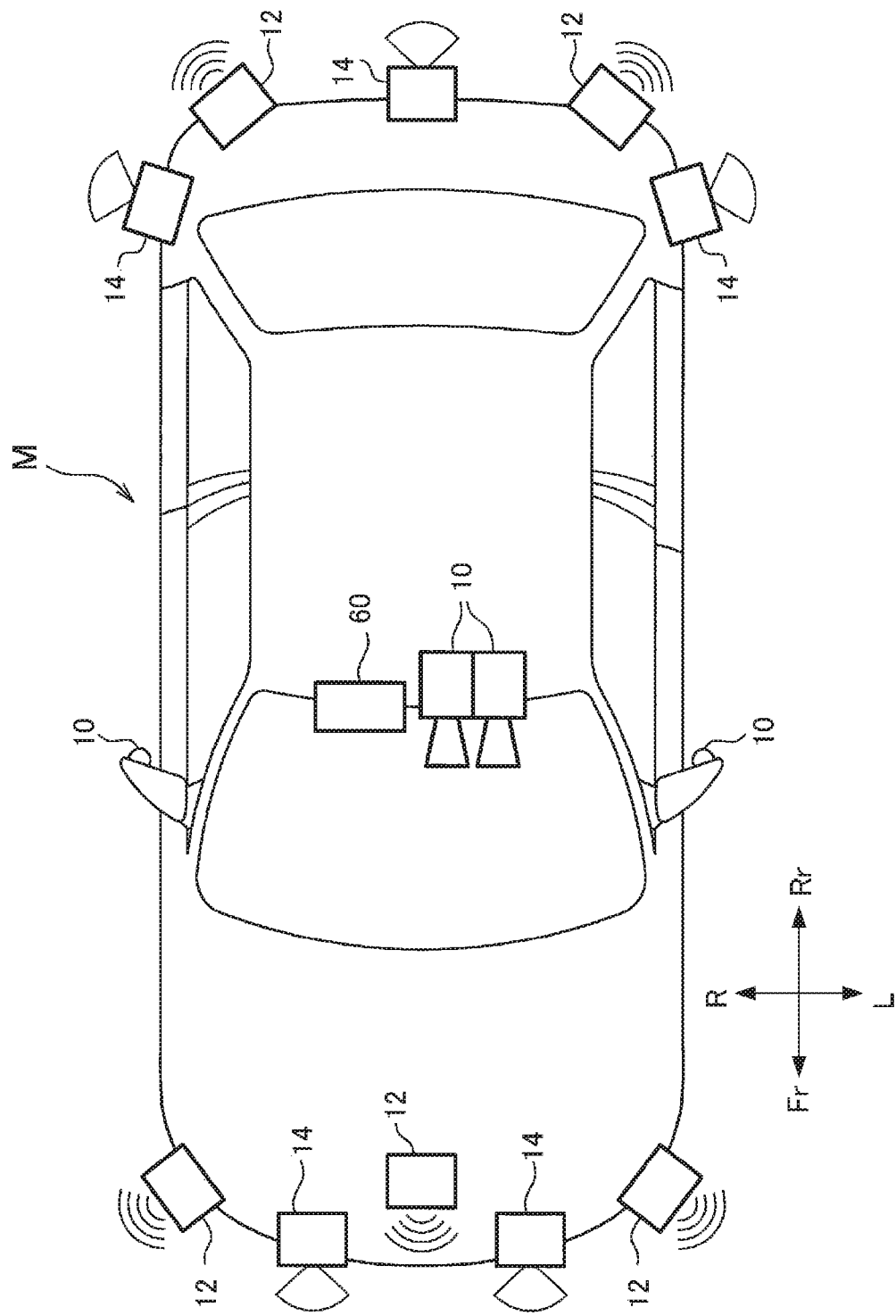
FIG. 2 is a schematic view illustrating an example of an external configuration of a vehicle M included in the vehicle system 1.

FIG. 1 is a block diagram illustrating an overall configuration of the vehicle system 1 on which the control device 100 is mounted. FIG. 2 is a schematic view illustrating an example of an external configuration of a vehicle M included in the vehicle system 1. The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates by using electric power generated by an electrical generator connected to the internal combustion engine or electric power discharged from a secondary battery or a fuel cell. FIG. 2 illustrates the example in which the vehicle M is a four-wheeled vehicle.

The vehicle system 1 includes, for example, cameras 10, radar devices 12, light detection and ranging (LIDAR) 14, a communication device 20, a human machine interface (HMI) 30, a vehicle sensor 40, a driver monitor camera 50, a navigation device 60, a map positioning unit (MPU) 70, a driving operator 80, the control device 100, a travel driving force output device 200, a brake device 210, and a steering device 220. These apparatuses and devices are connected to one another by a multiplex communication line such as a controller area network (CAN) communication line, a serial communication line, a wireless communication network, or the like.

The camera 10 is, for example, a digital camera using an imaging element such as charge coupled device (CCD) or a complementary metal oxide semiconductor (CMOS). The camera 10 is attached to an optional place of the vehicle M. For example, as illustrated in FIG. 2, the cameras 10 are provided in the vicinity of a rearview mirror (not illustrated) in a vehicle interior of the vehicle M, and in a front portion of a right door and a front portion of a left door in a vehicle exterior of the vehicle M. Image information (output information of the cameras 10) on a front side, a right rear side, and a left rear side in a traveling direction of the vehicle M captured by the camera 10 is transmitted to the control device 100.

The radar device 12 radiates radio waves such as millimeter waves to the around of the vehicle M, detects radio waves (reflected waves) reflected by an object, and acquires distribution information (distances and orientations of a plurality of reflection points) on reflection points of the radio waves of the object. As the radio wave, a laser, a microwave, a millimeter wave, an ultrasonic wave, or the like can be appropriately used. The radar device 12 is attached to an optional place of the vehicle M. For example, as illustrated in FIG. 2, five radar devices 12 are provided, three of them are provided on the front side, and two of them are provided on the rear side. Output information of the radar devices 12 is transmitted to the control device 100.

The LIDAR 14 emits light (or an electromagnetic wave having a wavelength close to that of the light) to the around of the vehicle M and measures scattered light. The LIDAR 14 detects the presence or absence of the object and a distance to the object based on a time from the light emission to light reception. The emitted light is, for example, pulsed laser light. The LIDAR 14 is attached to an optional place of the vehicle M. For example, as illustrated in FIG. 2, five LIDAR 14 are provided, two of them are provided on the front side, and three of them are provided on the rear side. Output information of the LIDAR 14 is transmitted to the control device 100.

The communication device 20 communicates with another vehicle present in the around of the vehicle M by using, for example, a cellular network, a Wi-Fi (registered trademark) network, Bluetooth (registered trademark), and dedicated short range communication (DSRC), or communicates with various server devices via a wireless base station.

The HMI 30 presents various types of information to an occupant of the vehicle M and receives an input operation performed by the occupant. The HMI 30 includes various display devices, speakers, buzzers, touch panels, switches, keys, and the like.

The vehicle sensor 40 includes a vehicle speed sensor that detects a speed of the vehicle M, an acceleration sensor that detects acceleration, a yaw rate sensor that detects an angular velocity around a vertical axis, a direction sensor that detects a direction of the vehicle M, and the like.

The driver monitor camera 50 is, for example, a digital camera using an imaging element such as a CCD image sensor or a CMOS image sensor. The driver monitor camera 50 is attached to an optional place of the vehicle M at a position and in a direction in which an image of a head of an occupant (hereinafter, referred to as a driver) seated in a driver seat of the vehicle M can be captured from a front (in a direction in which an image of a face is captured).

The navigation device 60 includes, for example, a global navigation satellite system receiver 61, a navigation HMI 62, and a route determination unit 63. The navigation device 60 stores first map information 64 in a storage device such as a hard disk drive (HDD) or a flash memory.

The GNSS receiver 61 specifies a position of the vehicle M based on a signal received from a GNSS satellite. The position of the vehicle M may be specified or complemented by an inertial navigation system (INS) using an output of the vehicle sensor 40.

The navigation HMI 62 includes display devices, speakers, touch panels, keys, and the like. The navigation HMI 62 may be partially or entirely shared with the HMI 30 described above.

For example, the route determination unit 63 determines, with reference to the first map information 64, a route (hereinafter, referred to as on-map route) from the position of the vehicle M specified by the GNSS receiver 61 (or an input optional position) to a destination input by the occupant by using the navigation HMI 62. The first map information 64 is, for example, information in which a road shape is represented by a link indicating a road and nodes connected by the link. The first map information 64 may include a curvature of a road, point of interest (POI) information, and the like. The on-map route is output to the MPU 70.

The navigation device 60 may perform, based on the on-map route, route guidance using the navigation HMI 62. The navigation device 60 may transmit a current position and the destination to a navigation server via the communication device 20 and acquire a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided from the navigation device 60 into a plurality of blocks (for example, divides the on-map route every 100 [m] in the traveling direction of the vehicle), and determines a recommended lane for each block with reference to the second map information 72. For example, the recommended lane determination unit 71 determines which lane from the left the vehicle travels in. When there is a branching place on the on-map route, the recommended lane determination unit 71 determines the recommended lane such that the vehicle M can travel on a reasonable route for traveling to a branch destination.

The second map information 72 is map information having accuracy higher than that of the first map information 64. The second map information 72 includes information on a center of a lane, information on boundaries of the lane, or the like. The second map information 72 may further include road information, traffic regulation information, address information, facility information, telephone number information, and the like. The second map information 72 may be updated as needed by the communication device 20 communicating with another device.

The driving operator 80 includes, for example, an accelerator pedal, a brake pedal, a shift lever, a blinker, and other operators in addition to a steering wheel 82. A sensor that detects an operation amount or presence or absence of an operation is attached to the driving operator 80, and a detection result thereof is output to the control device 100 or a part or all of the travel driving force output device 200, the brake device 210, and the steering device 220.

The steering wheel 82 does not necessarily have to be annular, and may be in a form of an irregularly shaped steering member, a joystick, a button, or the like. A steering grip sensor 84 is attached to the steering wheel 82. The steering grip sensor 84 is implemented by an electrostatic capacitance sensor or the like, and outputs a signal capable of detecting whether the driver grips the steering wheel 82 to the control device 100.

The control device 100 includes at least a processor such as a central processing unit (CPU) and a storage medium necessary for an operation of the processor. The processor functions as a first control unit 120 and a second control unit 160 by executing a program stored in the storage medium. The control device 100 is not limited to one that performs processing by a single processor, and may be one that performs processing by a plurality of processors in a shared manner.

<Configurations of First Control Unit 120 and Second Control Unit 160>

Figure 3:
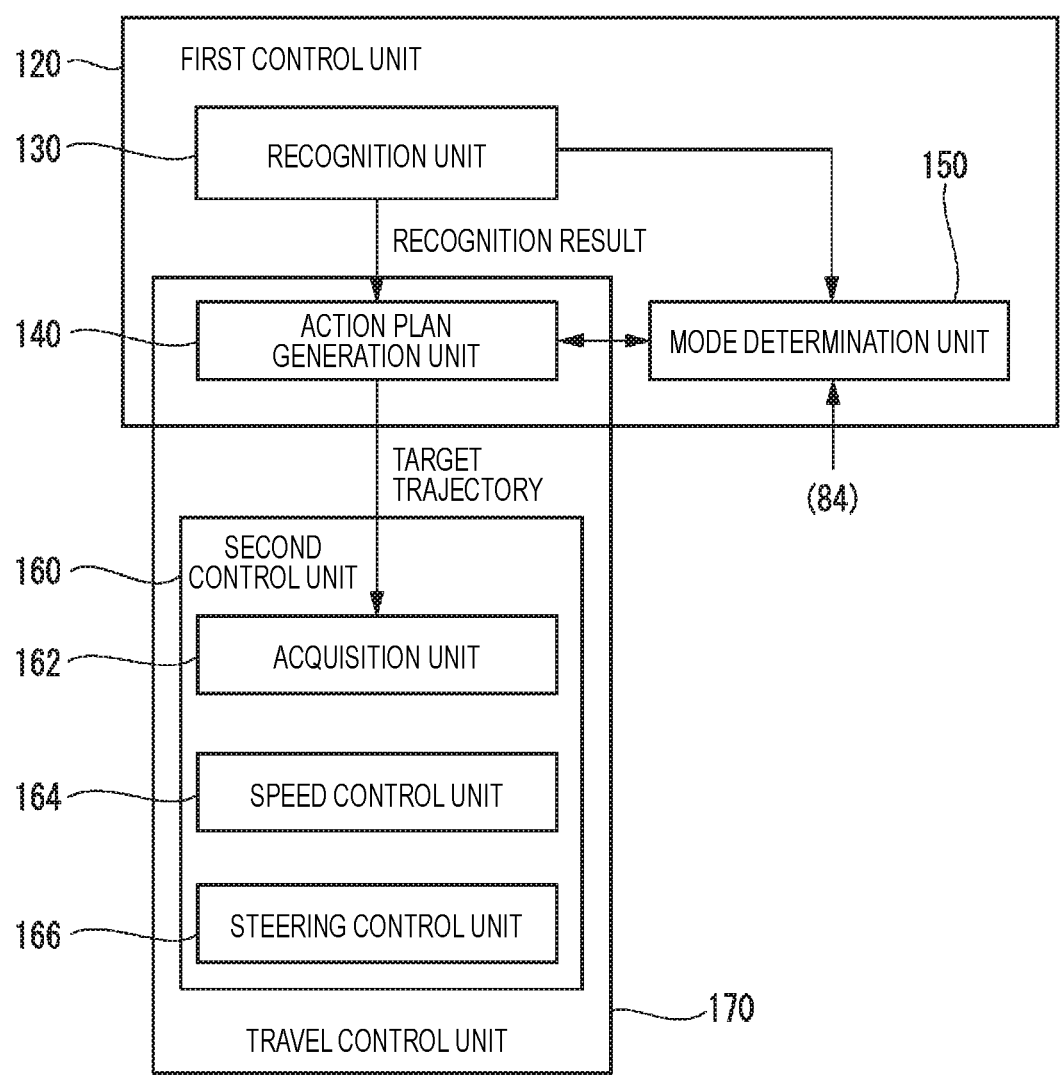
FIG. 3 is a diagram illustrating an example of configurations of a first control unit 120 and a second control unit 160.

FIG. 3 is a diagram illustrating an example of configurations of the first control unit 120 and the second control unit 160. The first control unit 120 includes, for example, a recognition unit 130, an action plan generation unit 140, and a mode determination unit 150. The first control unit 120 implements, for example, a function by artificial intelligence (AI) and a function by a model given in advance in parallel.

For example, a function of "recognizing an intersection" may be implemented by executing recognition of the intersection based on deep learning or the like and recognition based on a condition (including a signal, a road sign, or the like that can be subjected to pattern matching) given in advance in parallel, scoring both of them, and comprehensively evaluating them. Accordingly, reliability of automatic driving is ensured.

For example, the recognition unit 130 recognizes a travel environment in which the vehicle M is traveling. For example, the recognition unit 130 recognizes a travel lane of the vehicle M by comparing a pattern of a road partition line (for example, an arrangement of solid lines and broken lines) obtained from the second map information 72 with a pattern of a road partition line in the around of the vehicle M recognized from an image captured by the camera 10. The recognition unit 130 may recognize the travel lane by recognizing traveling boundaries (road boundaries) including the road partition lines, road shoulders, curbstones, a median strip, guardrails, or the like, without being limited to the road partition lines. In the recognition, the position of the vehicle M acquired from the navigation device 60 or a processing result obtained by the INS may be added. Further, the recognition unit 130 recognizes a temporary stop line, an obstacle, a red light, a toll gate, and other road events.

When recognizing the travel lane, the recognition unit 130 recognizes the position and a posture of the vehicle M with respect to the travel lane. For example, the recognition unit 130 may recognize a deviation of a reference point of the vehicle M from a center of the lane and an angle formed between a traveling direction of the vehicle M and a line connecting a center of the lane as a relative position and a posture of the vehicle M with respect to the travel lane. Alternatively, the recognition unit 130 may recognize a position of the reference point of the vehicle M with respect to any side end portion (a road partition line or a road boundary) of the travel lane as the relative position of the vehicle M with respect to the travel lane.

The recognition unit 130 recognizes a peripheral environment of the vehicle M based on output information of a part or all of the cameras 10, the radar devices 12, and the LIDAR 14. For example, the recognition unit 130 recognizes a position of an object in the around of the vehicle M, a type of the object (whether the object is a moving object or a stationary object), and the like. The position of the object is recognized as, for example, a position on absolute coordinates (an XY plane indicated by a Y axis (a Y axis Ay in FIG. 6) that passes through a representative point (a center of gravity, a center of a driving axis, or the like) of the vehicle M and is parallel to a left-right direction and an X axis (an X axis Ax in FIG. 6) that passes through the representative point of the vehicle M and is parallel to the front-rear direction) having the representative point of the vehicle M as an origin, and is used for various types of control.

Examples of the object in the around of the vehicle M include a moving object (another vehicle traveling around the vehicle M) and a stationary object (an object forming a boundary of a road such as a planting, a wall, or a median strip, or an installation object (a cone, a guardrail, a signboard, a temporary traffic light, or the like)) specific to construction work or an accident. The installation object includes a specific object (specifically, a pylon) that can be discretely arranged on the road. The recognition unit 130 performs, as recognition of the specific object in the around of the vehicle M, first processing of recognizing the pylon based on the output of the radar devices 12 and second processing of recognizing the pylon based on the output information of the cameras 10.

The recognition unit 130 performs processing of recognizing that the peripheral environment of the vehicle M is a travel-restricted section based on the output information of a part or all of the cameras 10, the radar devices 12, and the LIDAR 14. The phrase "the peripheral environment of the vehicle M is a travel-restricted section" refers to either a situation in which the vehicle M is traveling in the travel-restricted section or a situation in which the travel-restricted section is present ahead of the vehicle M by a predetermined distance. A phrase "the peripheral environment of the vehicle M is not a travel-restricted section" refers to a situation in which the vehicle M is not traveling in the travel-restricted section and the travel-restricted section is not present ahead of the vehicle M.

The action plan generation unit 140 generates a target trajectory along which the vehicle M travels in the future automatically (not depending on an operation of the driver) such that the vehicle M travels in a recommended lane determined by the recommended lane determination unit 71 in principle and the recommended lane can cope with a surrounding situation of the vehicle M. The target trajectory includes, for example, a speed element. For example, the target trajectory is represented by sequentially arranging points (trajectory points) to be reached by the vehicle M. The trajectory point is a point to be reached by the vehicle M for each predetermined travel distance (for example, about several[m]) at a road distance, and separately, a target speed and a target acceleration for each predetermined sampling time (for example, about 0.X [sec]) are generated as a part of the target trajectory. The trajectory point may be a position to be reached by the vehicle M at a sampling time point for each predetermined sampling time. In this case, information on the target speed and the target acceleration is represented by an interval between the trajectory points.

When generating the target trajectory, the action plan generation unit 140 may set an event of the automatic driving. Examples of the event of the automatic driving include a constant speed traveling event, a low speed following traveling event, a lane change event, a branching event, a merging event, and a takeover event. The action plan generation unit 140 generates the target trajectory in accordance with an activated event.

The mode determination unit 150 determines a driving mode of the vehicle M to be any one of a plurality of driving modes having different tasks imposed on the driver. Further, when a task of the determined driving mode (hereinafter, referred to as current driving mode) is not implemented by the driver, the mode determination unit 150 changes the driving mode of the vehicle M to a driving mode having a heavier task. The mode determination unit 150 is an example of a control state setting unit that selects an automation mode of control of at least one of the travel speed and steering of the vehicle M from the plurality of driving modes and set the automation mode.

<Specific Example of Driving Mode>

Figure 4:
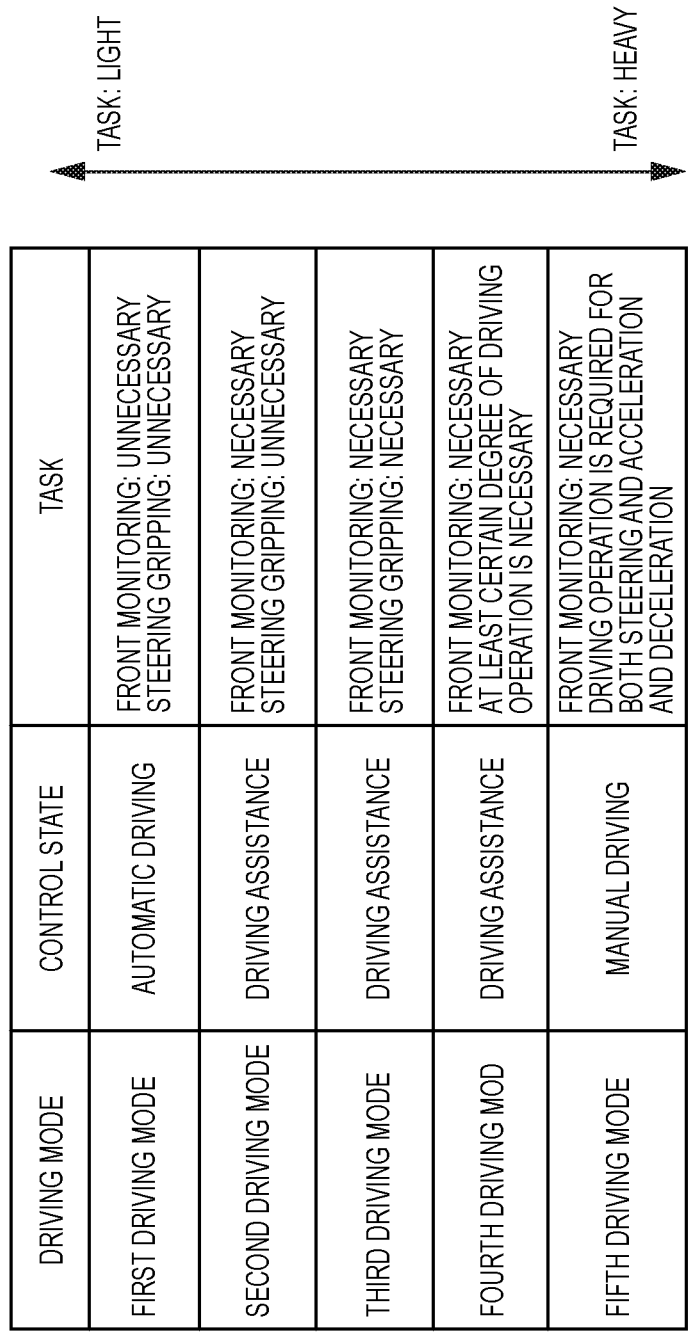
FIG. 4 is a diagram illustrating specific examples of a driving mode.

FIG. 4 is a diagram illustrating a specific example of the driving mode. The driving mode of the vehicle M includes, for example, five modes from a first driving mode to a fifth driving mode. A control state, that is, a degree of automation of driving control of the vehicle M is the highest in the first driving mode, then decreases in an order of the second driving mode, the third driving mode, and the fourth driving mode, and is the lowest in the fifth driving mode. On the contrary, a task imposed on the driver is the lightest in the first driving mode, then becomes heavy in an order of the second driving mode, the third driving mode, and the fourth driving mode, and is the heaviest in the fifth driving mode. Since the driving mode is in the control state which is not the automatic driving in the driving modes other than the first driving mode, the control device 100 is in charge of ending control of the automatic driving and shifting to driving assistance or manual driving. Hereinafter, contents of the respective driving modes will be exemplified.

In the first driving mode, an automatic driving state is established, and neither front monitoring nor gripping of the steering wheel 82 is imposed on the driver. However, even in the first driving mode, the driver is required to be in a posture capable of shifting to the manual driving in response to a request from the control device 100. Here, the term "automatic driving" means that both steering and acceleration and deceleration are controlled without depending on an operation of the driver. The front means a space in the traveling direction of the vehicle M visually recognized via a front windshield. The first driving mode is, for example, a driving mode that can be executed w % ben a condition is satisfied that the vehicle M is traveling at a predetermined speed or less (for example, about 60[km/h]) on an automobile dedicated road such as an expressway and a preceding vehicle to be followed is present.

In the second driving mode, a driving assistance state is established, and a task of monitoring the front of the vehicle M (hereinafter, referred to as front monitoring) is imposed on the driver, but a task of gripping the steering wheel 82 is not imposed on the driver. In the third driving mode, the driving assistance state is established, and the task of front monitoring and the task of gripping the steering wheel 82 are imposed on the driver. The fourth driving mode is a driving mode in which a certain degree of driving operation by the driver is necessary for at least one of the steering and the acceleration and deceleration of the vehicle M. For example, in the fourth driving mode, driving assistance such as adaptive cruise control (ACC) and lane keeping assist system (LKAS) is performed. The fifth driving mode is a manual driving state in which the driving operation by the driver is required for both steering and acceleration and deceleration. In both the fourth driving mode and the fifth driving mode, the task of monitoring the front of the vehicle M is naturally imposed on the driver.

Returning to FIG. 3, the second control unit 160 performs control such that the vehicle M passes through the target trajectory generated by the action plan generation unit 140 at a scheduled time point. The second control unit 160 includes, for example, an acquisition unit 162, a speed control unit 164, and a steering control unit 166.

The acquisition unit 162 acquires information on the target trajectory (trajectory points) generated by the action plan generation unit 140, and stores the acquired information in a memory (not illustrated). The speed control unit 164 controls the travel driving force output device 200 (see FIG. 1) or the brake device 210 (see FIG. 1) based on the speed element accompanying the target trajectory stored in the memory. The steering control unit 166 controls the steering device 220 (see FIG. 1) in accordance with a degree of curvature of the target trajectory stored in the memory. The processing of the speed control unit 164 and the steering control unit 166 is implemented by, for example, a combination of feedforward control and feedback control.

In the control device 100, a combination of the action plan generation unit 140 and the second control unit 160 constitutes a travel control unit 170. The travel control unit 170 executes control of the auto lane change in the vehicle M based on a recognition result of the travel environment, the peripheral environment, or the like of the vehicle M recognized by the recognition unit 130. In addition, the travel control unit 170 detects an intention of the driver to change the lane based on an operation of the driving operator 80 (for example, a blinker lever) performed by the driver.

The travel control unit 170 selects one lane change mode from a plurality of lane change modes having different degrees of involvement by the driver of the vehicle M, and performs travel control (also referred to as lane change control) according to the selected lane change mode. The plurality of lane change modes having different degrees of involvement by the driver of the vehicle M can be referred to as a plurality of lane change modes having different degrees of automation. The smaller the degree of involvement by the driver is, the higher the degree of automation is, and the larger the degree of involvement by the driver is, the lower the degree of automation is.

For example, the plurality of lane change modes may include the following three modes of the auto lane change. The first auto lane change is an intended automatic lane change (ALC-category C) in which the driver of the vehicle M intends to change lanes by himself or herself and the driver of the vehicle M instructs the start of the lane change. In the intended auto lane change, the driver of the vehicle M determines whether to change the lane in consideration of a travel state of another vehicle, a route to a destination, and the like. When the driver of the vehicle M determines to change the lane, the driver instructs the start of the lane change to the vehicle M by operating the driving operator 80. Based on the instruction, the travel control unit 170 starts the auto lane change at an executable timing in consideration of a surrounding travel state.

The second auto lane change is a proposed auto lane change (ALC-category D) in which the travel control unit 170 proposes the lane change and the driver of the vehicle M approves the lane change. In the proposed auto lane change, the travel control unit 170 determines whether to change the lane based on a travel state of another vehicle, the route to the destination, and the like. When determining to change the lane, the travel control unit 170 proposes the lane change to the driver. When approving the proposal of the lane change, the driver of the vehicle M gives an instruction to start the lane change to the vehicle M by operating an approval switch. The approval switch may be a switch dedicated to approval, or may be an operator (for example, the driving operator 80) that also serves as another function. Based on the instruction, the travel control unit 170 starts the auto lane change at an executable timing in consideration of the surrounding travel state. Therefore, when the driver does not approve the proposal of the lane change, that is, when the driver does not operate the driving operator 80, the auto lane change is not implemented.

The third auto lane change is a determined auto lane change (ALC-category E) in which the travel control unit 170 determines the lane change and the travel control unit 170 determines to start the lane change. In the determined auto lane change, the travel control unit 170 determines whether to change the lane based on the travel state of another vehicle, the route to the destination, and the like. When the travel control unit 170 determines to change the lane, the travel control unit 170 starts the auto lane change at an executable timing in consideration of the surrounding travel state. In the case of the determined auto lane change, the driver of the vehicle M is not involved in the lane change.

The control device 100 executes the auto lane change according to the driving mode. For example, the control device 100 may execute the determined auto lane change in the first driving mode. The control device 100 may execute the proposed auto lane change in the second driving mode, the third driving mode, and the fourth driving mode. The control device 100 may execute the intended auto lane change in the third driving mode and the fourth driving mode. The control device 100 does not execute any auto lane change in the fifth driving mode.

Returning to FIG. 1, the travel driving force output device 200 outputs a travel driving force (torque) for the vehicle to travel to driving wheels. The travel driving force output device 200 includes, for example, a combination of an internal combustion engine, an electric motor, a transmission, and the like, and an electronic control unit (ECU) that controls these components. The ECU controls the above-described configuration components according to information received from the second control unit 160 or information received from the driving operator 80.

The brake device 210 includes, for example, a brake caliper, a cylinder that transfers hydraulic pressure to the brake caliper, an electric motor that generates the hydraulic pressure in the cylinder, and a brake ECU. The brake ECU controls the electric motor according to the information received from the second control unit 160 or the information received from the driving operator 80 such that a brake torque according to a braking operation is output to each wheel.

The steering device 220 includes, for example, a steering ECU and an electric motor. For example, the electric motor changes a direction of steering wheels by applying a force to a rack and pinion mechanism. The steering ECU drives the electric motor and changes the direction of the steering wheels according to the information received from the second control unit 160 or the information received from the driving operator 80.

<Recognition of Range Including Pylon>

Figure 5:
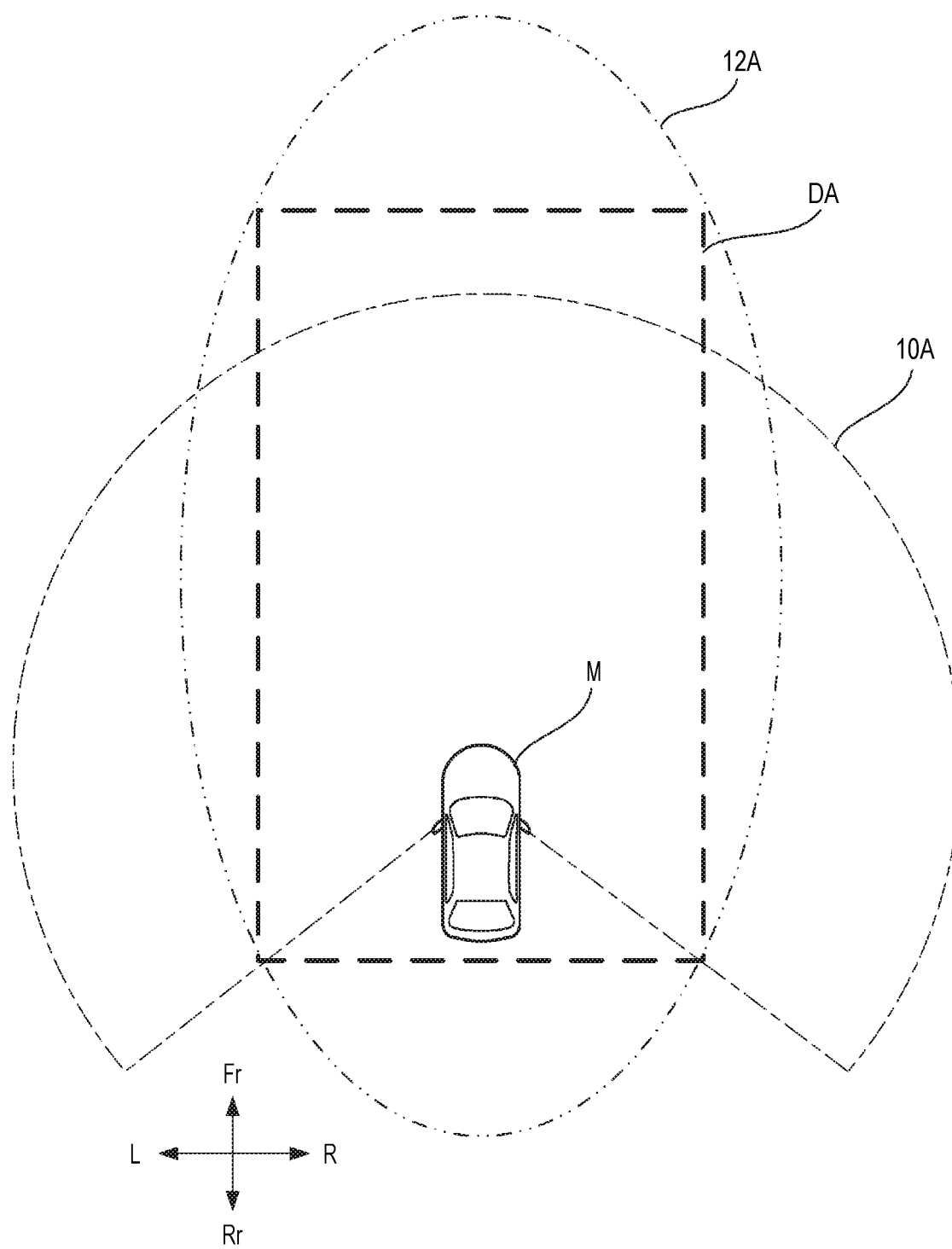
FIG. 5 is a view schematically illustrating a region in which a pylon can be recognized by a recognition unit 130 in the around of the vehicle M.

FIG. 5 is a view schematically illustrating a region in which the pylon can be recognized by the recognition unit 130 in the around of the vehicle M. FIG. 5 illustrates a range 10A in which the object can be detected by the cameras 10 and a range 12A in which the object can be detected by the radar devices 12. The recognition unit 130 sets, for example, a peripheral region DA included in the range 12A, overlapping with a part of the range 10A, and having a sufficiently high detection resolution of the object detected by the cameras 10 and the radar devices 12 as a recognition target region of the pylon. A width of the peripheral region DA in the front-rear direction is set to be greater than a width of the peripheral region DA in the left-right direction. Further, the peripheral region DA is set such that the position of the vehicle M is offset to a rear side in the front-rear direction. That is, the width of the peripheral region DA in the front-rear direction in front of the position of the vehicle M is greater than the width of the peripheral region DA in the front-rear direction behind the position of the vehicle M.

Figure 6:
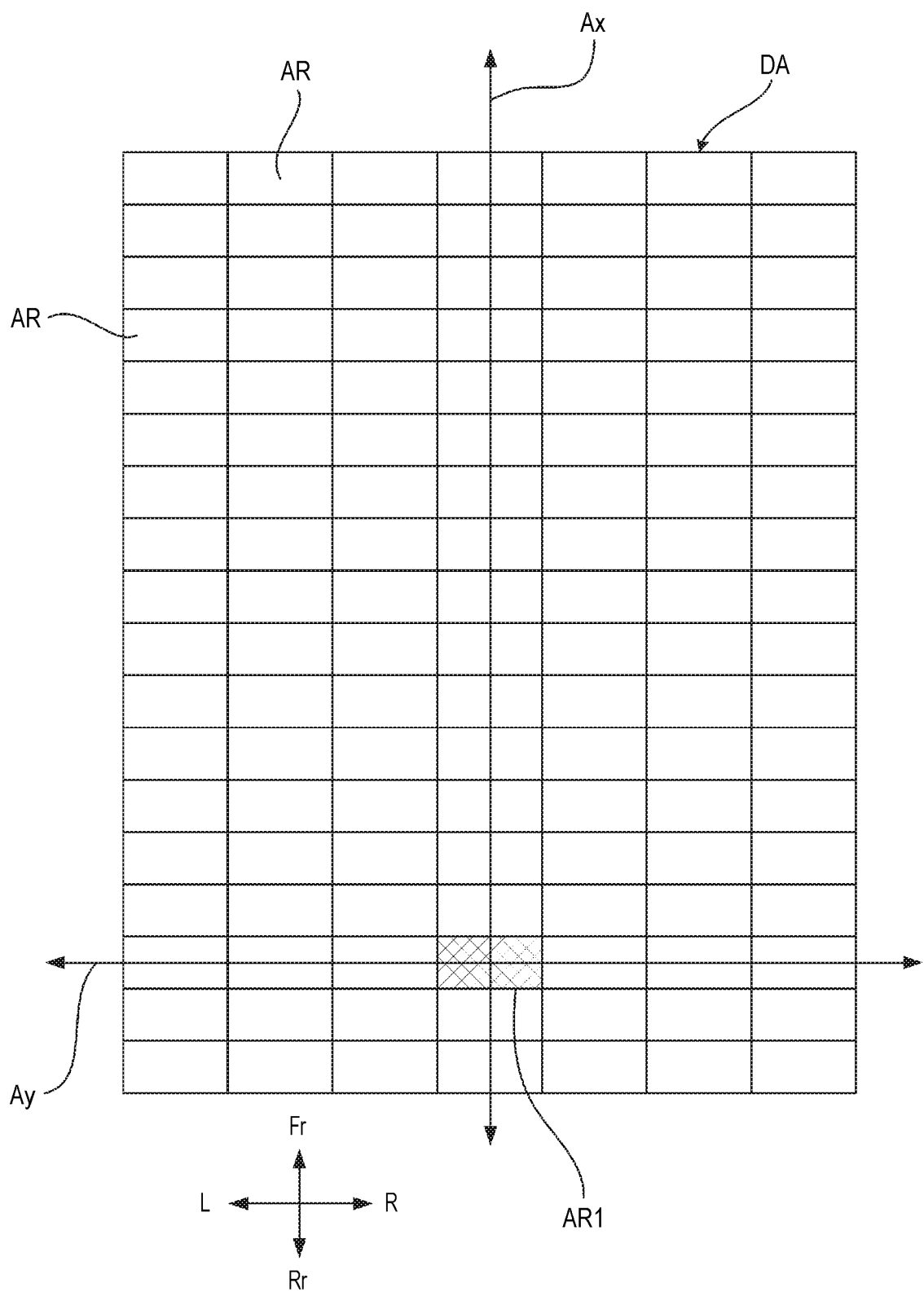
FIG. 6 is a schematic view illustrating an example of division of a peripheral region DA.

The recognition unit 130 manages the peripheral region DA by dividing the peripheral region DA into a plurality of ranges. FIG. 6 is a schematic view illustrating an example of division of the peripheral region DA. In the example illustrated in FIG. 6, the peripheral region DA is divided into seven parts in the left-right direction and 18 parts in the front-rear direction, which means the peripheral region DA is divided into 126 ranges AR (rectangles elongated in the left-right direction in the drawing). Hereinafter, when the specific range AR is distinguished from other ranges, the range AR is described as a range AR* (* is any number). A position (center position) of each range AR is expressed as coordinates on the XY plane. A range AR1 in FIG. 6 indicates a range including the vehicle M, and a position of the range AR1 coincides with the position of the vehicle M.

Figure 7:
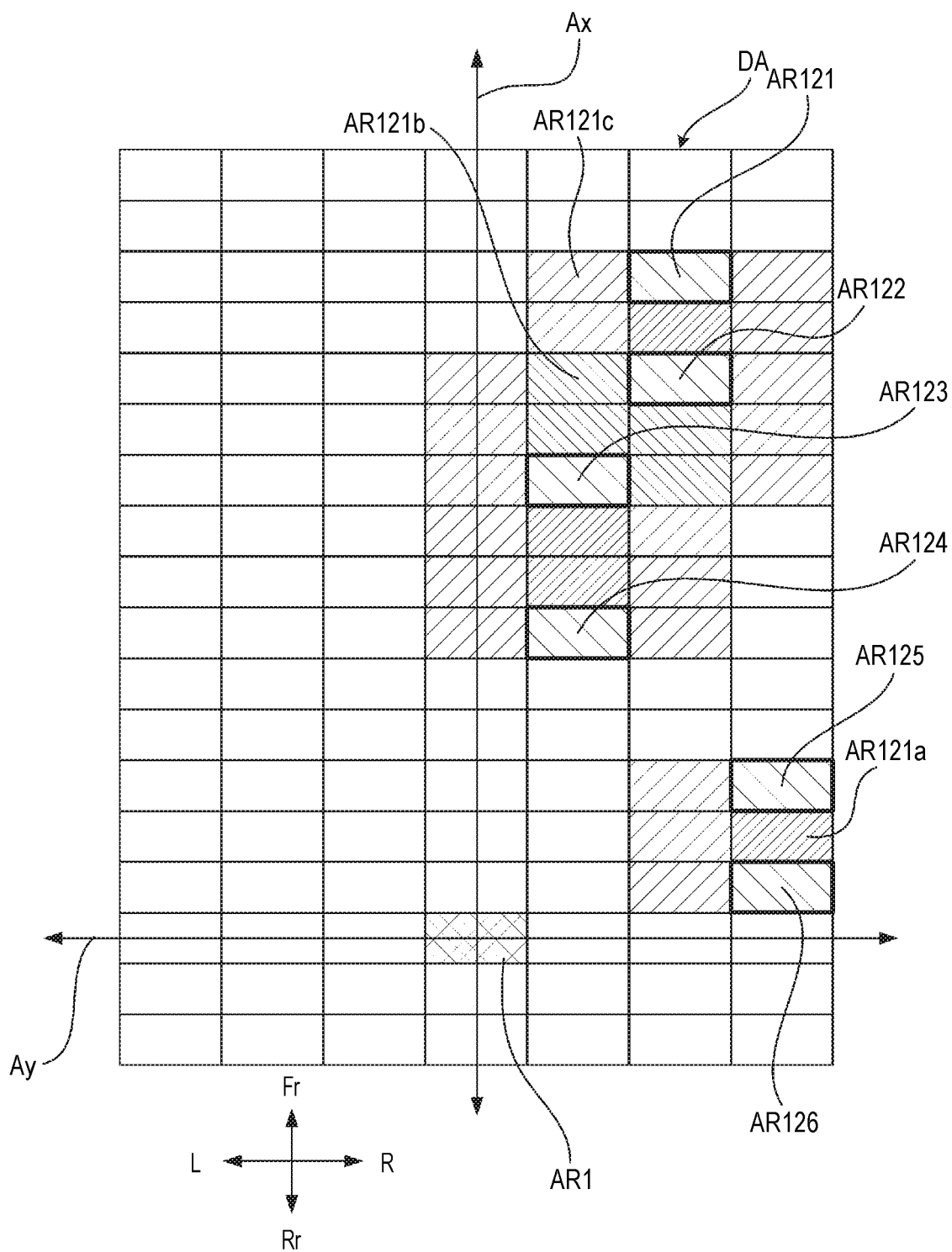
FIG. 7 is a schematic view illustrating an example of first ranges and third ranges.

The recognition unit 130 acquires the output information of the radar devices 12 in the peripheral region DA, recognizes a position and an orientation of the pylon based on the output information, and performs the first processing of recognizing the range AR (hereinafter, referred to as a first range) including the pylon among the ranges AR constituting the peripheral region DA. FIG. 7 illustrates an example in which six ranges including a range AR121 to a range AR126 are recognized as the first ranges by the first processing.

Figure 8:
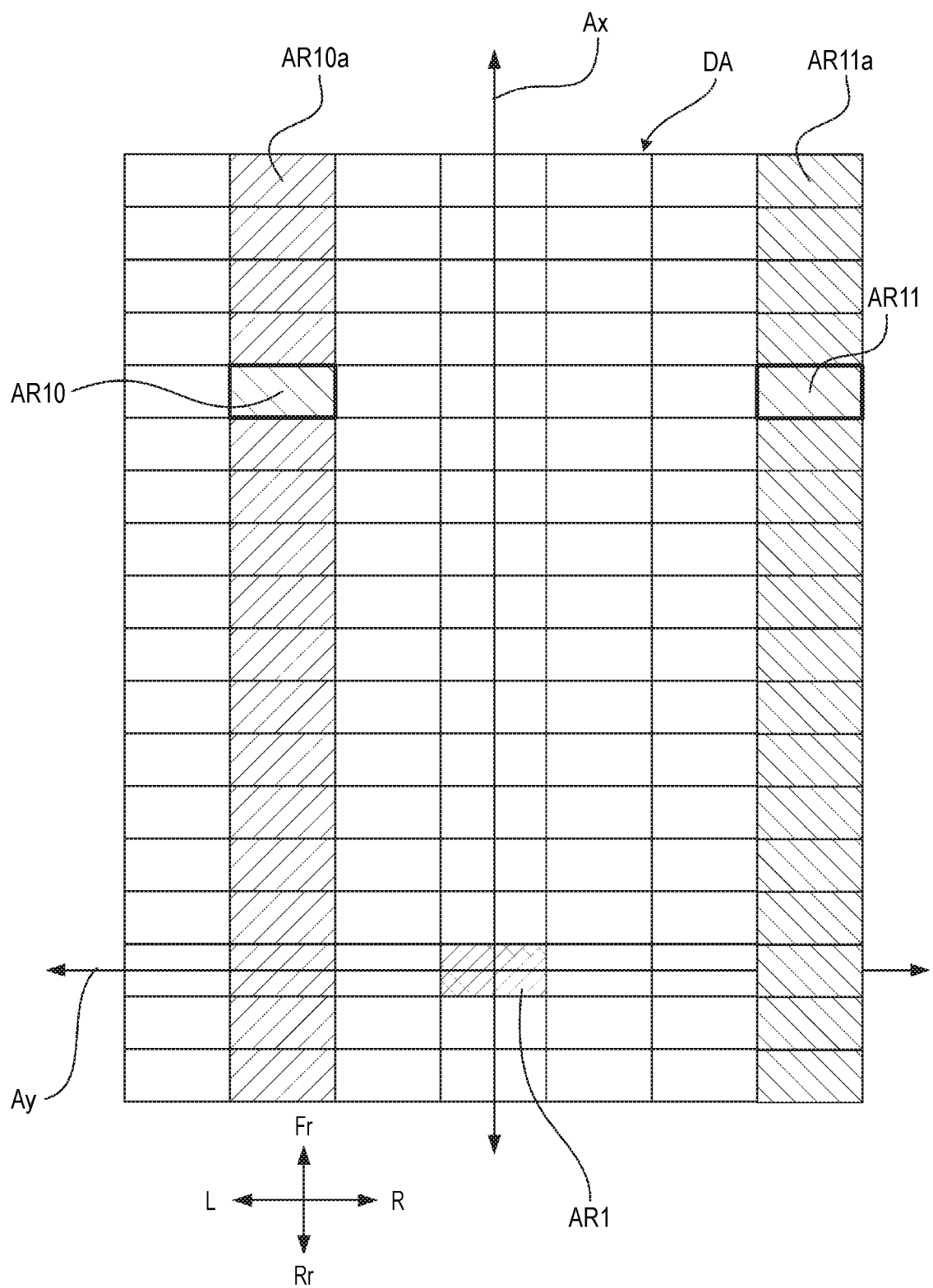
FIG. 8 is a schematic view illustrating an example of second ranges and fourth ranges.

The recognition unit 130 acquires the output information of the cameras 10 in the peripheral region DA, recognizes the position and the orientation of the pylon based on the output information, and performs second processing of recognizing the range AR (hereinafter, referred to as a second range) including the pylon among the ranges AR constituting the peripheral region DA. FIG. 8 illustrates an example in which a range AR10 and a range AR11 are recognized as the second ranges by the second processing.

<Determination of Reliability of Recognition Result of First Processing>

When the recognition unit 130 recognizes the first range, the recognition unit 130 selects at least one range AR as a third range from the remaining ranges AR obtained by excluding the first range in the peripheral region DA based on a position of the first range. Specifically, the recognition unit 130 selects the range AR at least adjacent to the first range.

For example, when there are two first ranges having the same position in the left-right direction and arranged with each other as one or two ranges AR interposed therebetween in the front-rear direction, the recognition unit 130 selects all the ranges AR between the two first ranges as the third ranges. In the example of FIG. 7, the range AR between the range AR121 and the range AR122, two ranges AR between the range AR123 and the range AR124, and the range AR between the range AR125 and the range AR126 (these are collectively illustrated as ranges AR121a) are selected as the third ranges.

When there are two first ranges adjacent to each other in the left-right direction and separated from each other by one range AR or two ranges AR in the front-rear direction, the recognition unit 130 selects the ranges AR surrounded by the two first ranges as the third ranges. In the example of FIG. 7, the range AR122 and the range AR123 are present as the first ranges adjacent to each other in the left-right direction and separated from each other by one range AR in the front-rear direction. Therefore, four ranges AR surrounded by the range AR122 and the range AR123 (these are collectively illustrated as ranges AR121b) are selected as the third ranges.

Further, the recognition unit 130 selects, as the third ranges, the ranges AR adjacent to each of the first ranges and the selected ranges AR in the left-right direction among the remaining ranges AR obtained by excluding the first ranges and the ranges AR which are selected so far. In the example of FIG. 7, the ranges AR (collectively referred to as ranges AR121c) adjacent to each of the range AR121 to the range AR126, the ranges AR121a, and the ranges AR121b in the left-right direction are selected as the third ranges.

A method of selecting the third ranges is an example, and the present disclosure is not limited thereto. For example, the recognition unit 130 may select the ranges AR at least adjacent to each of the first ranges in the left-right direction as the third ranges, select the ranges AR at least adjacent to each of the first ranges in the left-right direction and the front-rear direction as the third ranges, or select all ranges AR at least adjacent to each of the first ranges as the third ranges.

When the selection of the third ranges is completed, the recognition unit 130 acquires a result of the second processing, and performs processing of determining whether there is a range recognized as the second range including the pylon by the second processing in all the third ranges. In the processing, if a determination result thereof is YES, the recognition unit 130 determines that reliability of the recognition result of the first ranges is equal to or greater than a threshold, and if the determination result is NO, the recognition unit 130 determines that the reliability of the recognition result of the first ranges is less than the threshold. That is, the recognition unit 130 determines the reliability of the recognition result (the recognition result in which the pylon is included in the first ranges) of the first ranges based on the recognition result (whether the pylon is included in the third ranges) of the second processing for the third ranges adjacent to the first ranges.

In the example of FIG. 7, for example, when there is a range recognized as the second range in the five third ranges adjacent to the range AR121, the recognition unit 130 determines that the reliability of the recognition result in which the ranges AR121 to AR125 are recognized as the first ranges is equal to or greater than the threshold, and when there is no range recognized as the second range in all the third ranges, the recognition unit 130 determines that the reliability of the recognition result of the first processing in which the ranges AR121 to AR125 are recognized as the first ranges is less than the threshold.

In this way, when the first ranges are recognized by the first processing, the reliability of the recognition result of the first ranges can be determined by an identification result of the second processing for the third ranges selected from the periphery of the first ranges. Therefore, even when the first ranges are erroneously recognized due to an error of a first sensor, it is not necessary to adopt this result. Therefore, when an identification result of the first processing is used in subsequent control, accuracy of the control can be improved.

<Determination of Reliability of Recognition Result of Second Processing>

The recognition unit 130 determines not only the reliability of the recognition result of the first processing but also the reliability of the recognition result of the second processing. When the recognition unit 130 recognizes the second ranges, the recognition unit 130 selects, based on positions of the second ranges, at least one range AR as a fourth range from the remaining ranges AR obtained by excluding the second ranges in the peripheral region DA. Specifically, the recognition unit 130 selects, as the fourth ranges, the ranges AR which are at least adjacent to the second ranges. Preferably, the recognition unit 130 selects, as the fourth ranges, the ranges AR which are at least adjacent to the second ranges in the front-rear direction.

For example, the recognition unit 130 selects, as the fourth ranges, all the ranges AR having the same position in the left-right direction as the second ranges. In the example of FIG. 8, 17 ranges AR10a having the same position in the left-right direction as the range AR10 are selected as the fourth ranges, and 17 ranges AR11a having the same position in the left-right direction as the range AR11 are selected as the fourth ranges.

When the selection of the fourth ranges is completed, the recognition unit 130 acquires a result of the first processing, and determines whether there is a range recognized as the first range by the first processing in all the fourth ranges. If a determination result thereof is YES, the recognition unit 130 determines that the reliability of the recognition result of the second ranges is equal to or greater than the threshold, and if the determination result is NO, the recognition unit 130 determines that the reliability of the recognition result of the second range is less than the threshold. That is, the recognition unit 130 determines the reliability of the recognition result (the recognition result in which the pylon is included in the second ranges) of the second ranges based on the recognition result (whether the pylon is included in the fourth ranges) of the first processing for the fourth ranges having the same position in the left-right direction as the second ranges.

In the example of FIG. 8, when there is a range recognized as the first range in the ranges AR10a and the ranges AR11a, the recognition unit 130 determines that the reliability of the recognition result of the second processing in which the ranges AR10 and AR11 are recognized as the second ranges is equal to or greater than the threshold, and when there is no first range in the ranges AR10a and the ranges AR11a, the recognition unit 130 determines that the reliability of the recognition result of the second processing in which the ranges AR10 and AR11 are recognized as the second ranges is less than the threshold.

In this way, when the second ranges are recognized by the second processing, the reliability of the recognition result of the second ranges can be determined by an identification result of the first processing for the fourth ranges selected from the periphery of the second ranges. Therefore, even when the second ranges are erroneously recognized due to an error of a second sensor, it is not necessary to adopt this result. Therefore, when the identification result of the second processing is used in subsequent control, accuracy of the control can be improved.

<Recognition of Travel-Restricted Section>

The recognition unit 130 recognizes the first ranges and the second ranges, and recognizes that the peripheral environment of the vehicle M is the travel-restricted section when both the reliability of the recognition result of the first processing and the reliability of the recognition result of the second processing are equal to or greater than the threshold. In this way, when the reliability of both the results of the first processing and the second processing is high, it is recognized that the peripheral environment of the vehicle M is the travel-restricted section, and therefore the recognition of the travel-restricted section can be performed with high accuracy.

When both the first ranges and the second ranges are recognized, the recognition unit 130 may recognize that the peripheral environment of the vehicle M is the travel-restricted section when the reliability of the recognition result of one of the first ranges and the second ranges is equal to or greater than the threshold. Even in this case, an influence of an error of the cameras 10 or the radar devices 12 can be eliminated and the travel-restricted section can be recognized with high accuracy.

When the recognition unit 130 recognizes that the travel environment is the travel-restricted section, the travel control unit 170 preferably restricts the travel control of the vehicle M. Specifically, the travel control unit 170 restricts the lane change control. The restriction of the lane change control refers to prohibiting the lane change control or prohibiting a part of the lane change mode although the lane change control is executed. In this way, in a situation in which the vehicle M is traveling in the travel-restricted section or in a situation in which the vehicle M is approaching the travel-restricted section, it is possible to cause the vehicle M to travel safely by restricting the lane change control performed by the control device 100.

Figure 9:
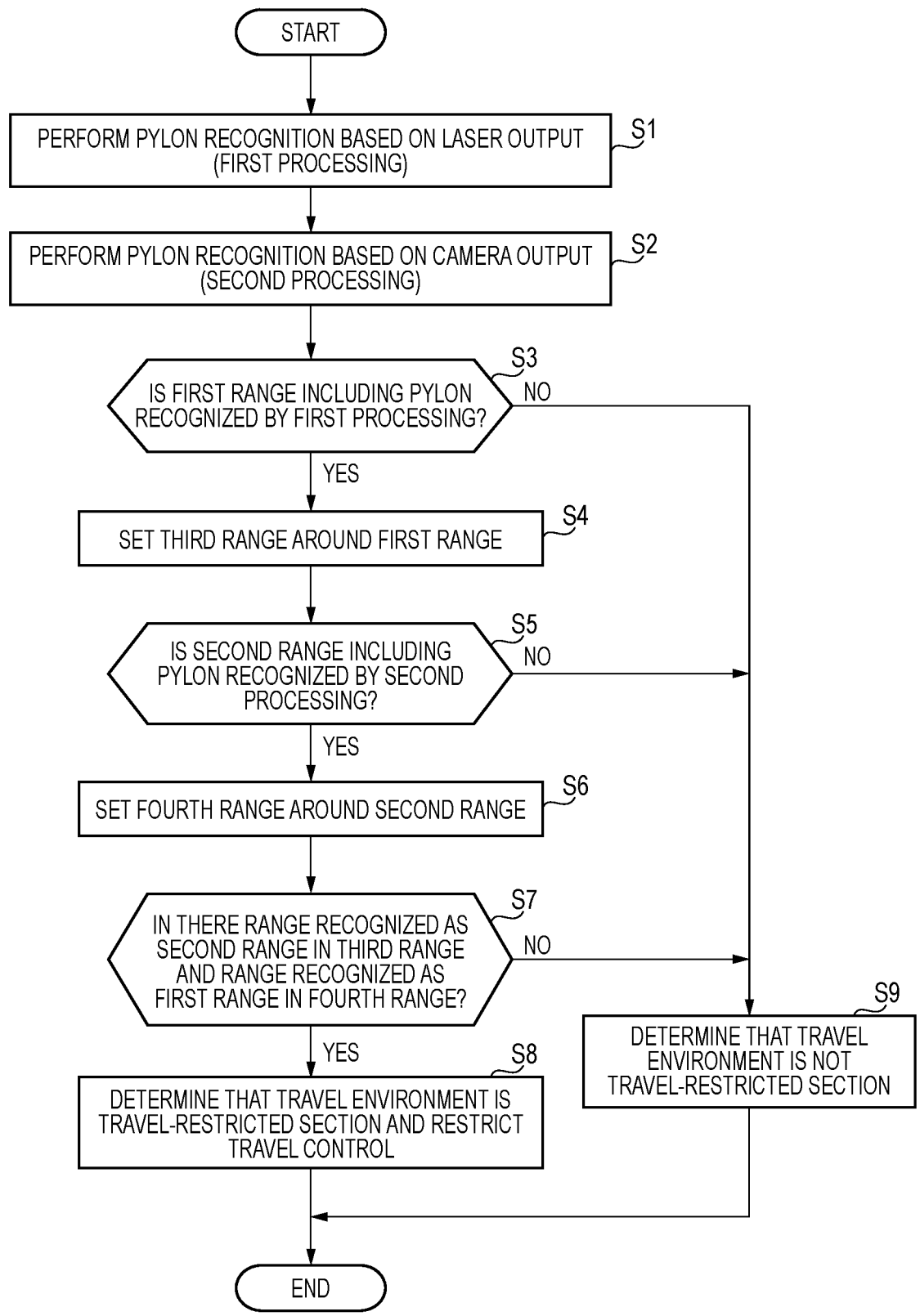
FIG. 9 is a flowchart illustrating an operation of the control device 100.

Hereinafter, an operation of the control device 100 will be described with reference to a flowchart. FIG. 9 is the flowchart illustrating the operation of the control device 100. Processing illustrated in FIG. 9 is performed, for example, during execution of any one of the first driving mode to the fourth driving mode illustrated in FIG. 4.

When acquiring the output information of the radar devices 12, the recognition unit 130 executes, based on the output information, the first processing of recognizing the first range including the pylon among all the ranges AR constituting the peripheral region DA (step S1).

When acquiring the output information of the cameras 10, the recognition unit 130 executes, based on the output information, the second processing of recognizing the second range including the pylon among all the ranges AR constituting the peripheral region DA (step S2).

When the recognition unit 130 recognizes the first range in step S1 (YES in step S3), the recognition unit 130 sets the third range around the first range based on the recognized first range (step S4). When the recognition unit 130 does not recognize the first range in step S1 (NO in step S3), the recognition unit 130 determines that the travel environment is not the travel-restricted section (step S9), and ends the processing.

When the determination in step S3 is YES and the second range is recognized in step S2 (YES in step S5), the recognition unit 130 sets the fourth range around the second range based on the recognized second range (step S6). When the recognition unit 130 does not recognize the second range in step S2 (NO in step S5), the recognition unit 130 determines that the travel environment is not the travel-restricted section (step S9), and ends the processing.

After step S6, the recognition unit 130 determines whether there is a range recognized as the second range in the third range and whether there is a range recognized as the first range in the fourth range (step S7). When the determination in step S7 is YES, the recognition unit 130 determines that the travel environment is the travel-restricted section, prohibits the lane change control performed by the travel control unit 170 (step S8), and ends the processing. When the determination of step S7 is NO, the recognition unit 130 performs the processing of step S9. The processing is repeated until the processing of step S8 is performed.

Figure 10:
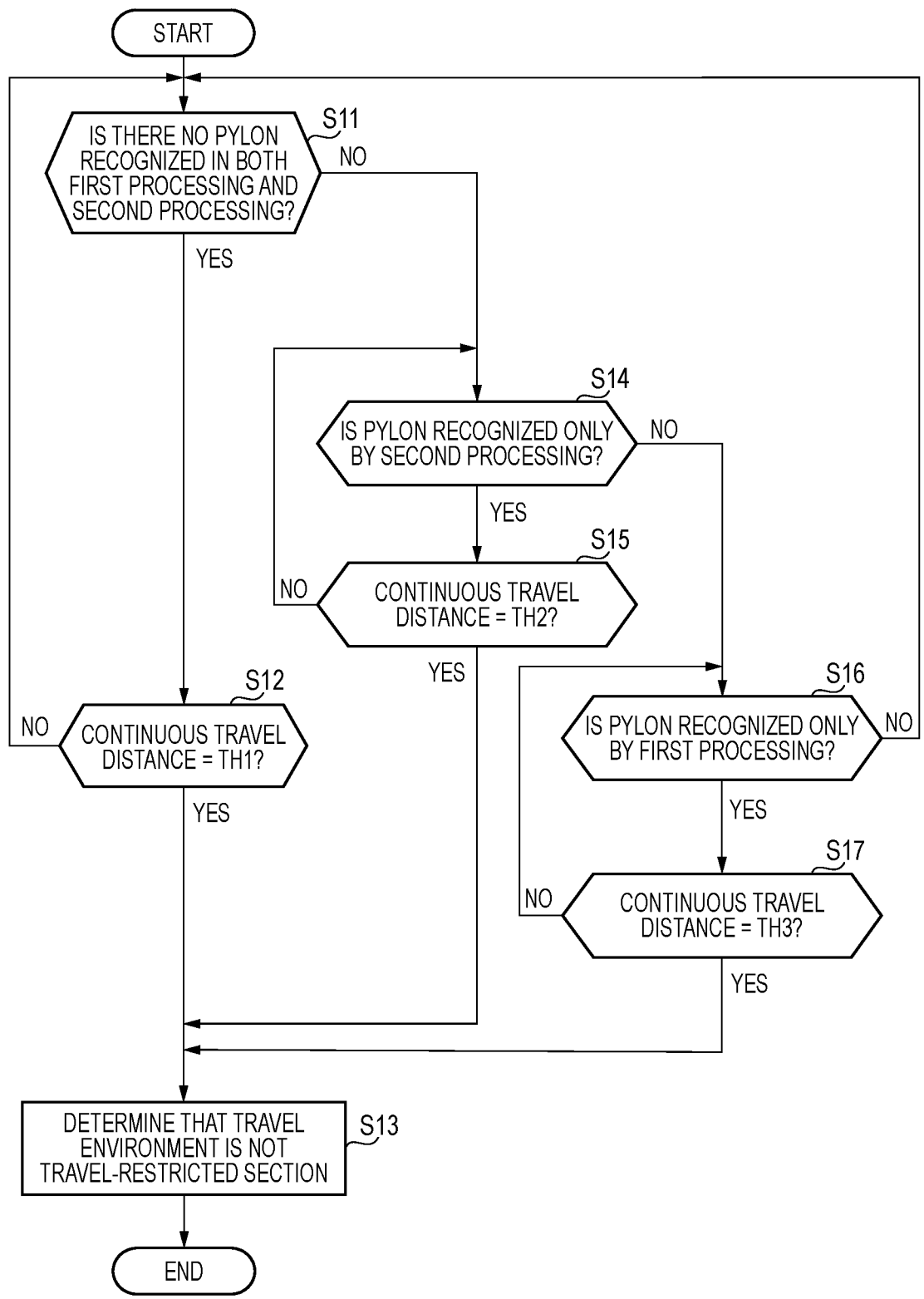
FIG. 10 is a flowchart illustrating an operation of the control device 100 after processing of step S8 in FIG. 9 is performed.

FIG. 10 is a flowchart illustrating an operation of the control device 100 after the processing of step S8 of FIG. 9 is performed.

When both of a first state in which the first range is not recognized by the first processing and a second state in which the second range is not recognized by the second processing are implemented (YES in step S11), the recognition unit 130 starts counting a travel distance of the vehicle M, and determines whether the travel distance reaches a threshold TH1 in step S12 (step S12). When the determination in step S12 is NO, the recognition unit 130 returns the processing to step S1l, and when the determination in step S12 is YES, the recognition unit 130 determines that the travel environment is not the travel-restricted section (step S13), and returns to the processing illustrated in FIG. 9.

When the determination in step S11 is YES, that is, when the pylon is recognized in at least one of the first processing and the second processing, the recognition unit 130 returns a count value of the travel distance to an initial value, and determines whether the pylon is recognized only in the second processing of the first processing and the second processing (step S14). When the determination in step S14 is YES, the recognition unit 130 starts counting the travel distance of the vehicle M and determines whether the travel distance reaches a threshold TH2 (step S15). When the determination in step S15 is NO, the recognition unit 130 returns the processing to step S14, and when the determination in step S15 is YES, the recognition unit 130 determines that the travel environment is not the travel-restricted section (step S13), and returns to the processing illustrated in FIG. 9.

When the determination in step S14 is NO, the recognition unit 130 returns the count value of the travel distance to the initial value, and determines whether the pylon is recognized only by the first processing (step S16). When the determination in step S16 is YES, the recognition unit 130 starts counting the travel distance of the vehicle M and determines whether the travel distance reaches a threshold TH3 (step S17). When the determination in step S17 is NO, the recognition unit 130 returns the processing to step S16, and when the determination in step S17 is YES, the recognition unit 130 determines that the travel environment is not the travel-restricted section (step S13), and returns to the processing illustrated in FIG. 9. When the determination in step S16 is NO, that is, when neither the first state nor the second state is implemented (when the pylon is recognized in both the first processing and the second processing), the recognition unit 130 returns the count value of the travel distance to the initial value, and returns the processing to step S11. The threshold TH2 and the threshold TH3 are larger than the threshold TH1. The threshold TH2 is larger than the threshold TH3.

In this way, after the recognition unit 130 determines that the peripheral environment is the travel-restricted section, the recognition unit 130 determines that the peripheral environment is not the travel-restricted section when one or both of the first state in which the first range is not recognized by the first processing and the second state in which the second range is not recognized by the second processing are continued. Therefore, since complicated processing is not necessary from when it is once determined that the section is the travel-restricted section to when it is determined that the section is not the travel-restricted section, the processing load can be reduced.

The continuation of the first state and the second state means that the pylon does not exist around the vehicle M with high accuracy. Therefore, in this case, the prohibition of the lane change control can be cancelled at an early stage by determining in advance that the peripheral environment is not the travel-restricted section. On the other hand, the continuation of only one of the first state and the second state means that there is a possibility that the pylon is present around the vehicle M. Therefore, in this case, the lane change control can be appropriately prohibited and the safety can be improved by lengthening a time until it is determined that the section is not the travel-restricted section.

In the present description, at least the following matters are described. Although corresponding components or the like in the above embodiment are shown in parentheses, the present disclosure is not limited thereto.

(1) A control device (control device 100) that performs travel control of a vehicle (vehicle M), the control device includes a processor configured to acquire output information of a first type of a first sensor (radar device 12) and output information of a second type of a second sensor (camera 10) each configured to detect an object in an around of the vehicle.

The processor is configured to: perform first processing of recognizing a first range (range AR121 to range AR126) including a specific object (pylon) among a plurality of ranges (ranges AR) set in a peripheral region (peripheral region DA) of the vehicle based on the output information of the first sensor, and second processing of recognizing a second range (range AR10 and range AR11) including the specific object among the plurality of ranges based on the output information of the second sensor; select, based on the first range, a third range (range AR121a, range AR121b and range AR121c) from the plurality of ranges obtained by excluding the first range; and determine reliability of a recognition result of the first range based on a recognition result of the second processing for the third range.

According to (1), even when accuracy of the recognition result of the first processing is low due to an error of the first sensor or the like, the reliability of the recognition result of the first processing can be determined based on the recognition result of the second processing, and the recognition result of the first processing can be used or not used for subsequent processing. Therefore, accuracy of various types of control performed based on the recognition result of the specific object can be improved.

(2) The control device according to (1), in which when the second range is included in the third range (for example, the range AR121c adjacent to the range AR121 is recognized as the second range), the processor determines that reliability of a recognition result of the first processing (recognition result in which the ranges AR121 to AR125 are ranges including the pylon) is equal to or greater than a threshold.

According to (2), for example, when the recognition that the specific object is present in the third range close to the first range is performed by the second processing, it can be determined that the reliability of the recognition result of the first processing is high, and thus, it is determined that the reliability is equal to or greater than the threshold. Therefore, accuracy of various types of control performed based on the recognition result of the first processing can be improved.

(3) The control device according to (1) or (2), in which the processor is configured to set, as the third range, the range at least adjacent to the first range in the plurality of ranges.

According to (3), the reliability of the recognition result of the first processing can be performed with high accuracy.

(4) The control device according to (3), in which when there are two first ranges having the same position in a left-right direction of the vehicle, the processor is configured to set the range between the two first ranges as the third range.

According to (4), the reliability of the recognition result of the first processing can be performed with high accuracy.

(5) The control device according to (3) or (4), in which the processor is configured to set, as the third range, the ranges located on both sides of the first range in the left-right direction of the vehicle.

According to (5), the reliability of the recognition result of the first processing can be performed with high accuracy.

(6) The control device according to any one of (1) to (5), in which the processor is configured to select, based on the second range, a fourth range (range AR10a and range AR11a) from the plurality of ranges obtained by excluding the second range, and determine reliability of a recognition result of the second range based on the recognition result of the first processing for the fourth range.

According to (6), even when accuracy of the recognition result of the second processing is low due to an error of the second sensor or the like, the reliability of the recognition result of the second processing can be determined based on the recognition result of the first processing, and the recognition result of the second processing can be used or not used for the subsequent processing. Therefore, the accuracy of various types of control performed based on the recognition result of the specific object can be improved.

(7) The control device according to (6), in which when the first range is included in the fourth range (for example, the range AR10a adjacent to the range AR10 is recognized as the first range), the processor determines that reliability of a recognition result of the second processing (recognition result in which the ranges AR10a and AR11 are ranges including the pylon) is equal to or greater than the threshold.

According to (7), for example, when the recognition that the specific object is present in the fourth range close to the second range is performed, it can be determined that the reliability of the recognition result of the second processing is high, and thus, it is determined that the reliability is equal to or greater than the threshold. Therefore, accuracy of various types of control performed based on the recognition result of the second processing can be improved.

(8) The control device according to (6) or (7), in which: the first sensor is a radar, the second sensor is a digital camera; and the processor is configured to select, as the fourth range, all the ranges (range AR10a and range AR11a) having the same position in the left-right direction of the vehicle as the second range among the plurality of ranges.

A range that can be captured by the camera in the front-rear direction tends to be narrower than a range that can be detected by the radar in the front-rear direction. According to (8), by selecting a range in the front-rear direction as the fourth range with respect to the second range recognized based on an output of the camera, an undetectable range of the camera can be compensated by the radar, and the reliability of the recognition result of the second range can be determined, and the reliability can be determined with high accuracy.

(9) The control device according to any one of (6) to (8), in which: the specific object is a pylon; and the processor is configured to recognize the first range and the second range, and determine that a peripheral environment of the vehicle is a travel-restricted section in which travel is restricted when both the reliability of the recognition result of the first processing and the reliability of the recognition result of the second processing are equal to or greater than the threshold.

According to (9), when the specific object is recognized in both the first processing and the second processing and the reliability of the recognition results of the first processing and the second processing is high, it can be determined that the peripheral environment of the vehicle is the travel-restricted section. Therefore, whether the peripheral environment is the travel-restricted section can be determined with high accuracy.

(10) The control device according to (9), in which after determining that the peripheral environment is the travel-restricted section, the processor is configured to determine that the peripheral environment is not the travel-restricted section when one or both of a first state in which the first range is not recognized by the first processing and a second state in which the second range is not recognized by the second processing are continued.

According to (10), since complicated processing is not necessary from when it is once determined that the section is the travel-restricted section to when it is determined that the section is not the travel-restricted section, processing load can be reduced.

(11) The control device according to (10), in which: the processor is configured to, when the first state and the second state continue for a period in which the vehicle travels a first distance (threshold TH1), determine that the peripheral environment is not the travel-restricted section, and when only one of the first state and the second state continues for a period in which the vehicle travels a second distance (threshold TH2 and threshold TH3), determine that the peripheral environment is not the travel-restricted section; and the second distance is greater than the first distance.

According to (11), the continuation of the first state and the second state means that the specific object does not exist around the vehicle with high accuracy. Therefore, in this case, by determining that the peripheral environment is not the travel-restricted section at an early stage, for example, a function restricted in the travel-restricted section can be restored in advance. On the other hand, the continuation of only one of the first state and the second state means that there is a possibility that the specific object is present around the vehicle. Therefore, in this case, the function restricted in the travel-restricted section can be continued, for example, by lengthening a time until it is determined that the peripheral environment is not the travel-restricted section.

(12) The control device according to any one of (9) to (11), in which the processor is configured to: perform lane change control of the vehicle; and restrict the lane change control when it is determined that the peripheral environment is the travel-restricted section.

According to (12), since the lane change is restricted in the travel-restricted section, safety can be improved.

(13) The control device according to any one of (1) to (12), in which a width of the peripheral region in a front-rear direction of the vehicle is set to be greater than a width of the peripheral region in the left-right direction of the vehicle, and a position of the vehicle in the peripheral region is set to a position decentered to a rear side of the peripheral region in the front-rear direction.

The invention claimed is:

1. A control device that performs travel control of a vehicle, the control device comprising
a processor configured to:
acquire output information of a first type of a first sensor and output information of a second type of a second sensor each configured to detect an object in an around of the vehicle;
perform first processing of recognizing a first range including a specific object among a plurality of ranges set in a peripheral region of the vehicle based on the output information of the first sensor, and second processing of recognizing a second range including the specific object among the plurality of ranges based on the output information of the second sensor;
set, as a third range, a range at least adjacent to the first range among the plurality of ranges;
determine reliability of a recognition result of the first processing based on a recognition result of the second processing for the third range;
determine that the reliability of the recognition result of the first processing is equal to or greater than a threshold in response to the second range being included in the third range;
determine that a peripheral environment of the vehicle is a travel-restricted section in which travel is restricted based on a determination result of the reliability of the recognition result of the first processing;
perform lane change control of the vehicle; and
restrict the lane change control in response to it being determined that the peripheral environment is the travel-restricted section.

2. The control device according to claim 1, wherein when there are two first ranges having a same position in a left-right direction of the vehicle, the processor is configured to set a range between the two first ranges as the third range.

3. The control device according to claim 1, wherein the processor is configured to set, as the third range, the ranges located on both sides of the first range in a left-right direction of the vehicle.

4. The control device according to claim 1, wherein the processor is configured to:
select, based on the second range, a fourth range from ranges obtained by excluding the second range from the plurality of ranges; and
determine reliability of a recognition result of the second range based on the recognition result of the first processing for the fourth range.

5. The control device according to claim 4, wherein the processor is configured to determine that reliability of the recognition result of the second processing is equal to or greater than the threshold in response to the first range being included in the fourth range.

6. The control device according to claim 4, wherein:
the first sensor is a radar;
the second sensor is a digital camera; and
the processor is configured to select, as the fourth range, all the ranges having a same position in a left-right direction of the vehicle as the second range among the plurality of ranges.

7. The control device according to claim 4, wherein:
the specific object is a pylon; and
the processor is configured to recognize the first range and the second range, and determine that the peripheral environment of the vehicle is the travel-restricted section in which travel is restricted when both the reliability of the recognition result of the first processing and the reliability of the recognition result of the second processing are equal to or greater than the threshold.

8. The control device according to claim 7, wherein after determining that the peripheral environment is the travel-restricted section, the processor is configured to determine that the peripheral environment is not the travel-restricted section when one or both of a first state in which the first range is not recognized by the first processing and a second state in which the second range is not recognized by the second processing are continued.

9. The control device according to claim 8, wherein:
when the first state and the second state continue for a period in which the vehicle travels a first distance, the processor determines that the peripheral environment is not the travel-restricted section,
when only one of the first state and the second state continues for a period in which the vehicle travels a second distance, the processor determines that the peripheral environment is not the travel-restricted section; and
the second distance is greater than the first distance.

10. The control device according to claim 1, wherein:
a width of the peripheral region in a front-rear direction of the vehicle is set to be greater than a width of the peripheral region in a left-right direction of the vehicle; and
a position of the vehicle in the peripheral region is set to a position decentered to a rear side of the peripheral region in the front-rear direction.

* * * * *